United States Patent Office 3,518,341
Patented June 30, 1970

3,518,341
PROCESS FOR PRODUCING SYNTHETIC RESIN
ARTICLES HAVING EXCELLENT MAR RESIST-
ANT SURFACES
Hiroshi Haryu, Tokyo, Japan, assignor to Mitsubishi
Rayon Co., Ltd., Tokyo, Japan, a corporation of
Japan
No Drawing. Filed May 18, 1967, Ser. No. 639,290
Claims priority, application Japan, May 23, 1966,
41/32,864; Aug. 19, 1966, 41/54,597
Int. Cl. B29d 7/02, 9/00, 11/00
U.S. Cl. 264—255                                6 Claims

ABSTRACT OF THE DISCLOSURE

A process for producing a molded synthetic resin article having an excellent mar resistant surface. The inner surface of a mold is coated with a dimethacrylate or diacrylate having a high affinity to a synthetic resin base material. The coating is covered with a film such as cellophane and completely polymerized. The film is removed from the completely polymerized coating and the mold is filled with a monomer material composed substantially of methyl methacrylate and/or styrene, or a partially polymerized material of the monomer. The monomer or partially polymerized monomer is then completely polymerized.

The present invention is an improvement of patent application Ser. No. 494,920 (filed Oct. 11, 1965) now Pat. No. 3,465,076.

As a process for imparting mar resistance to the surface of a synthetic resin article such as a methacrylic resin article, there has been known a method carried out by coating onto the inner surface of a mold a thin layer of a partially polymerized material of a starting material for highly mar resistant resin, e.g. allyl methacrylate (U.S. Pat. 2,479,935) or diethylene glycol dimethacrylate (U.S. Pat. 2,997,745), introducing into the mold a starting material for base resin, and then polymerizing the partially polymerized material of the starting material for mar resistant resin simultaneously with the starting material for base resin.

According to the above method, however, it is difficult to coat the inner surface of a mold without leaving uncoated portions, and the difficulty particularly increases with increasing size of the mold. Therefore, the above methods are not suitable for commercial scale processes. Further, the coated thin layer is difficulty prepared uniform in thickness, consequently, there are optical defects in the resulting molded article. In addition, the thin film adhered onto the inner surface of the mold has not completely been polymerized and hence is liable to be swollen or dissolved with the starting material for base resin charged later. Consequently, the mar resistance of the surface of the resulting molded synthetic resin article is considerably inferior, in general, to that of the mar resistant resin closely adhered onto the surface of base resin.

The present inventor previously invented a methacrylic resin article in which a thin layer of completely polymerized poly-(diethylene glycol bis-allyl carbonate) is closely adhered onto the surface. This article is not only excellent in mar resistance but also in transparence, and has a shock resistance and many other excellent properties equal to that of an ordinary methacrylic resin. Further, the adhesion between the surface layer and the base resin is considerably high, and the two are scarcely separated each other by cutting operation using an ordinary saw. However, the above methacrylic resin article suffers from such drawback that the surface film is peeled off with relative ease when the article is subjected to cross cut-adhesive cellophane tape test adopted for investigating the adhesion therebetween. (The above test is carried out in such a manner that using a needle, the surface layer is scarred, to such a depth as to break the film, with 11 lines intersecting at right angles each other to form a 1 cm.² square containing 100 pieces of 1 mm.² squares, an adhesive cellophane tape is applied to said 1 cm.² square and is then peeled off at one time from the surface, and the state of the peeled surface film is examined to judge the extent of adhesion of the surface layer.) Further, the thin layer of poly-(diethylene glycol bis-allyl-carbonate) is relatively poor in releasability from a mold. Therefore, in case the mold surface is a glass plate or the like, the use of said polymer brings about such drawback that fine glass pieces are sometimes adhered onto the surface of resin article and thus the surface of the glass plate is injured, with the result that the glass plate is limited in times of repeated uses to cause industrial disadvantages. In case a releasing agent is incorporated in an amount necessary to completely overcome the above drawback, cracks due to fine fissures are liable to be formed on the surface layer.

The present inventor made repeated studies on polymerizable coating materials capable of giving molded articles which are excellent in mar resistance, scarcely suffer from the peeling of the surface layer from the base resins even when the articles are subjected to the cross cut-adhesive cellophane tape test, and are favorable in releasability from the mold surface. As the result, the inventor has attained the present invention.

The present invention provides a commercially advantageous process for producing a molded synthetic resin article having an excellent mar resistance and a considerable shock resistance in which the surface of the article is composed of a highly mar resistant polymer containing 40% by weight or more of at least one member selected from polymerizable coating materials represented by the general formula:

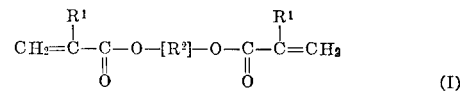

(I)

wherein $R^1$ is a hydrogen atom or a methyl group; and $R^2$ is a glycol residue of an aliphatic hydrocarbon having 2–20 carbon atoms or a derivative thereof and the main chain thereof may contain —O— bond, and by the general formula:

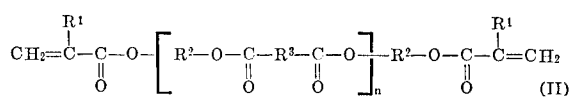

(II)

wherein $R^1$ and $R^2$ are the same as in the case of the general Formula I; $R^3$ is a dibasic acid residue of an aliphatic or aromatic hydrocarbon or a derivative thereof; and $n$ is an integer from 1 to 20, and the base resin portion is a synthetic resin having a considerable shock resistance.

The present invention further provides a process for forming a thin layer of a polymer on the inner surface of a mold member employed for the above object. The above-mentioned polymer is one containing 40% by weight or more of at least one member selected from polymerizable coating materials represented by the aforesaid general Formulas I and II which polymerize in the absence of oxygen and is removed from the inner surface of a mold member with a close adhesion to a base resin.

The present invention still further provides a process for producing a molded synthetic resin article having an excellent mar resistance and considerable impact resistance and transparency in which the surface is a polymer of said polymerizable coating material which has completely reproduced the inner surface of mold and the base part is a polymer composed substantially of methyl methacrylate and/or styrene.

The present invention is achieved in the following manner:

A mixture of said polymerizable coating material and a polymerization initiator therefor is applied onto the inner surface of a mold member. Onto the resulting coating material layer, a film having substantially no affinity for polymer produced from said material is closely covered while taking such case that no air bubble is left therebetween. Thereafter, the coating material is polymerized to such an extent that it is not swollen or dissolved with a starting material for base resin. After peeling off the covered film, the mold member is assembled to a mold. Into the mold, a mixture of a starting material for base resin and a polymerization initiator therefor is charged, and the mold is closed. Subsequently, the mold is heated to 30°–200° C., and after completion of the polymerization of said material for base resin, only the mold is removed, whereby the present invention is achieved.

In the present invention, the polymerizable coating material to be applied onto the inner surface of a mold is one or more of diacrylates or dimethacrylates represented by the aforesaid general Formula I or II, or a mixture of other polymerizable monomer and at least 40% by weight of said diacrylate or dimethacrylate, or a partially polymerized material thereof.

In case the polymer constituting the mar resistant surface of a synthetic resin article contains less than 40% by weight of the compound represented by the aforesaid Formula I or II, reak-like defects are liable to be formed on the surface layer of the product or in the interface between the surface layer and the base resin, with the result that the beautiful appearance of the product is spoiled and the mar resistance owned by the polymerizable coating material itself is undesirably decreased.

Polymerizable monomers preferably usable in admixture with the polymerizable coating materials are those which are starting materials for base resins.

Of the polymerizable coating materials employed in the present invention, the compounds represented by the general formula:

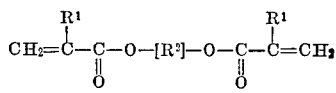

(I)

wherein $R^1$ and $R^2$ are as defined before, can be prepared from aliphatic glycols or derivative thereof and acrylic or methacrylic acid. As the aliphatic glycols, there are used glycols having no ether linkages in the main chains such as, for example, ethylene glycol, propylene glycol, 1,3-butanediol, 2,3-butanediol, 1,4-butanediol, 1,5-pentanediol and 1,4-hexanediol, or glycols having ether linkages in the main chains such as, for example, diethylene glycol, triethylene glycol, tetraethylene glycol and dipropylene glycol. Suitable glycols are those having 2–20 carbon atoms, preferably 4–10 carbon atoms. Among the polymerizable coating materials of the aforesaid general Formula I which have been prepared from aliphatic glycols or derivative thereof and acrylic or methacrylic acid, particularly preferable compounds include diethylene glycol dimethacrylate, triethylene glycol dimethacrylate, tetraethylene glycol dimethacrylate, commercially available polyethylene glycol dimethacrylate (produced by Sartomer Resins Inc., United States), hexamethylene glycol dimethacrylate, octamethylene glycol dimethacrylate, diethylene glycol diacrylate, triethylene glycol diacrylate and tetraethylene glycol diacrylate.

Further, the polymerizable coating materials represented by the general formula:

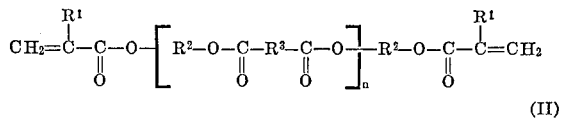

(II)

can be prepared from aliphatic glycols (including derivatives thereof) represented by the formula HO—$R_2$—OH, wherein $R_2$ is as defined before, aliphatic or aromatic dibasic acids (including derivatives thereof) represented by the formula HOOC—$R_3$—COOH, wherein $R_3$ is as defined before, and acrylic or methacrylic acid. As for the aliphatic glycols, there are used those employed in the preparation of the compounds represented by the aforesaid Formula I. As for the diabasic acids, there are used those having 4–10 carbon atoms, including, for example, such aliphatic dibasic acids as succinic, adipic and sebacic acids, and such aromatic dibasic aids as phthalic, isophthalic and terephthalic acids. In the general Formula II, n is preferably in the range of 1 to 10, particularly 1 to 5. Therefore, particularly preferable as the compounds represented by the Formula II are bis-(ethylene glycol) phthalate dimethacrylate, bis-(diethylene glycol) phthalate dimethacrylate, polyester dimethacrylate, bis-(ethylene glycol) phthalate diacrylate, bis-(diethylene glycol) phthalate diacrylate, bis-(diethylene glycol) sebacate dimethacrylate and bis-(ethylene glycol) sebacate dimethacrylate.

As the polymerization initiators for the polymerizable coating materials, there may be used peroxide or azo compounds. These include, for example, lauroyl peroxide, diisopropyl peroxy-dicarbonate and azobis-isobutyronitrile.

The application of the polymerizable coating material onto the inner surface of a mold can be effected by spraying or brushing or by flowing or dropping the material onto the inner surface of a mold. The polymerization of the polymerizable material coated on the inner surface of a mold is effected after closely covering the coated material by a film having substantially no affinity for polymer produced from said material, in order to make the resulting coating uniform as well as to intercept oxygen. According to this procedure, not only the same result is attained as in the case where the polymerization is carried out in an inert gas, but also the coated material is completely prevented from agglomerating into the form of drops either immediately after coating or during polymerization. Therefore, the above procedure is a highly valuable industrial method and is a means effective for the production of large size articles.

In arcordance with the present invention, no extension-promoting agent is required to be added, and therefore there are no various disadvantages derived from the addition of said agent. During closely covering a film onto the coated material, it is of importance to take such care that no air bubbles are left inside the film. In this case, it may be used, in order to form a coating having a smooth surface, a film which has been subjected to tension. The coated materials may be incorporated with ultra-violet ray absorbers and coloring matters.

In the present invention, the films to be closely covered onto the coated materials are those having substantially no affinity for the polymer produced from coated materials. Preferable films include those of polyester, polyvinyl alcohol, cellophane or cellulose, moisture-proof cellophane or moisture-proof cellulose, polyethylene, polyvinyl chloride, polyvinylidene chloride, cellulose acetate and polypropylene. In case a commercially available polyethylene, polyvinyl chloride, polyvinylidene chloride or polypropylene film is used, the polymerization of the coated material is disturbed in some cases, so it is necessary to use the said film incorporated with a stabilizer in such an amount as not to substantially disturb the polymerization of the coated material. The above-mentioned films has no affinity for the diacrylate or dimethacrylate polymer employed in the present invention. Therefore, when a film selected from the above-mentioned films is used, a thin polymer layer formed by polymerization of the coated material does not come off from the surface of a mold, when the film is peeled off.

Polymerization conditions for the material coated onto the inner surface of a mold member vary depending on the thickness of the layer applied thereto and the kind of the catalyst employed. Generally, however, the polymerization of the coated material can be completed by effecting the polymerization at 60° to 200° C. for 3 minutes to 50 hours.

The thus obtained mold members, in which a thin layer formed by complete polymerization of the polymerizable coating material is adhered onto the inner surface of a mold, are assembled to a mold according to a well known method, e.g. the method disclosed in U.S. Pat. No. 3,087,-197. In the present invention, the most preferable mold member is a tempered plate glass.

Into the mold thus assembled, a mixture of a starting material for base resin and a polymerization initiator is charged. The starting material for base resin to be used is methyl methacrylate and/or styrene or a mixture at least 50% by weight of said monomers. Particularly, the use of methyl methacrylate, a monomer mixture containing at least 70% by weight of methyl methacrylate, or a partially polymerized material thereof is preferable.

As comonomers preferable for use in admixture with methyl methacrylate, there are methacrylic acid, lower alkyl esters of methacrylic acid, acrylic acid, lower alkyl esters of acrylic acid, styrene and alkyl-substituted styrenes.

As comonomers preferables for use in admixture with styrene, there are lower alkyl esters of methacrylic acid, lower alkyl esters of acrylic acid, and alkyl-substituted styrenes.

As polymerization initiators for the starting materials for base resins, there may be used ordinary initiators such as, for example, oil-soluble peroxides of azo compounds After charging of the starting material for base resin, the mold is closed and is heated to 30°–150° C. to carry out the polymerization according to a well known method. Commercially, the polymerization is carried out according to, for example, the method disclosed in U.S. Pat. No. 3,087,197. The polymerization is usually carried out at two stages. After the completion of polymerization, the mold is released to obtain a highly valuable synthetic resin article, which is the desired product of the present invention.

The molded article can be simply released from the mold without any substantial difficulty even when the polymerizable coating material has not been incorporated with a releasing agent.

The following examples illustrate the present invention, but do not limit the principles of this invention.

In the examples, the mar value is represented by a value measured in the following manner:

A test piece is inclined at an angle of 45° to the horizontal direction and is rotated at a speed of 11 r.p.m. around a vertical axis. From a position of 70 cm. above the test piece, 300 g. of 60 mesh carborundum particles are dropped at a rate of 150 g./min. The mar value is expressed as a value of the haze after the dropping of carborundum minus the haze before the dropping of carborundum, wherein the haze is calculated by an equation:

$$\text{Haze (\%)} = \frac{\text{(Total luminous transmittance)} - \text{(Parallel luminous transmittance)}}{\text{Total luminous transmittance}} \times 100$$

In the following examples, all the percentages and parts except mar value are by weight.

EXAMPLE 1

Tetraethylene glycol dimethacrylate was mixed with 0.3% of azobisisobutyronitrile and was flowed and extended on one surface of a 10 mm. thick tempered glass plate with a size of 1,420 x 1,170 mm. The thus formed tetraethylene glycol dimethacrylate layer was covered with a 0.025 mm. thick commercial polyester film composed mainly of polyethylene therephthalate. The polyester film was pressed with a roller so that no air bubble is left inside the film, and the thickness of the tetraethylene glycol dimethacrylate layer was adjusted to be about 0.03 mm. The thus treated glass plate was heated in an air oven at 130° C. for 1 hour to polymerize said monomer, and then the polyester film was stripped off. The stripping off was easy, and only the completely polymerized poly-(tetraethylene glycol dimethacrylate) resin layer was left adhered onto the surface of the glass plate.

The two glass plates prepared in the above-mentioned manner were faced each other so that the thin poly-(tetraethylene glycol dimethacrylate) resin layer were internally exposed, and the circumference of the glass plates was sealed with a plasticized polyvinyl chloride gasket to assemble a mold. Into the mold was charged a partially polymerized methyl methacrylate syrup (viscosity of 100 cps.) containing 0.05% of azobisisobutyronitrile. After sealing the mold, the interval between the two glass plates was adjusted to 3.4 mm. Thereafter, the mold was heated in a water bath at 60° C. for 6 hours and heated further in an air oven at 120° C. for 2 hours, and then the resulting resin plate was released from the glass plates. The thin poly-(tetraethylene glycol dimethacrylate) resin layer on the glass plate surfaces had been completely adhered to the methacrylic resin sheet from the glass plate, and the thus obtained resin sheet had beautiful surfaces free from wrinkles, unevenness and optical defects.

The mar value of the resin sheet obtained in this example was 11%, whereas that of a resin sheet obtained without adoption of the above treatment was 55%. Further, the resin sheet was subjected to cross cut-adhesive cellophane tape test, but there was no peeled portion between the base resin and the surface layer.

EXAMPLE 2

Commercially available polyethylene glycol dimethacrylate (produced by Sartomer Resins Inc.) was mixed with 0.3% of azobisisobutyronitrile and was poured and extended on one surface of a glass plate. The thus formed polyethylene glycol dimethacrylate layer was covered with a 0.03 mm. thick commercial vinylon film which had been subjected to tension. The vinylon film was pressed with a roller, discharging air bubbles in the layer, so that the vinylon film was closely covered onto the glass plate and the thickness of the layer was adjusted to be about 0.02 mm. The thus treated glass plate was heated in an air bath at 120° C. for 2 hours to polymerize said monomer. Thereafter, the vinylon film was stripped off to adhere only the resulting poly-(polyethylene glycol dimethacrylate) resin layer onto the surface of the glass plate.

Two glass plates obtained in the above manner were used to prepare a mold in the same manner as in Example 1. Into the mold was charged a partially polymerized material containing 0.05% of azobisisobutyronitrile which had been obtained from 10 parts of methyl acrylate and 90 parts of methyl methacrylate, and the interval between the glass plates was adjusted to 5 mm. The mold was heated in the same manner as in Example 1, and the resulting resin sheet was released from the glass plates.

The thin poly-(polyethylene glycol dimethacrylate) resin layer on the glass plate surfaces had been completely adhered to the methacrylic resin sheet, and the resin sheet thus obtained had beautiful surfaces free from wrinkles, unevenness and optical defects. The mar value of the resin sheet obtained in this example was 10% and even when the resin sheet was subjected to cross cut-adhesive cellophane tape test, there was no peeled portion between the base resin and the surface layer.

EXAMPLE 3

A mixture comprising 50 parts of tetraethylene glycol dimethacrylate and 50 parts of methyl methacrylate was incorporated with 0.3% of azobisisobutyronitrile and was poured and extended on one surface of a glass plate. The resulting layer of said mixture was covered with the same polyester film as in Example 1. Subsequently, the polyester film was pressed with a roller discharging air bubbles in the layer, so that the film was closely covered to the glass plate and the thickness of said layer was adjusted to be about 0.02 mm. The thus treated glass plate was heated in an air oven at 120° C. for 2 hours to polymerize said monomer mixture. Thereafter, the polyester film was stripped off to adhere only the resulting thin resin layer onto the surface of the glass plate.

Two glass plates contained in the above manner were used to prepare a mold. Into the mold was charged a partially polymerized material prepared from a mixture comprising 80 parts of methyl methacrylate and 20 parts of methacrylic acid, and the interval between the glass plates was adjusted to 3 mm. The mold was heated in the same manner as in Example 1 to obtain a resin sheet.

The thin resin layer on the glass plate surfaces had been completely transferred to the methacrylic resin sheet, and the resin sheet thus obtained had beautiful surfaces free from unevenness and optical defects.

The mar value of the resin plate obtained in this example was 15%, and even when the resin sheet was subjected to cross cut-adhesive cellophane tape test, there was no peeled portion between the base resin and the surface layer.

EXAMPLE 4

A mixture of triethylene glycol dimethacrylate and 0.5% of lauroyl peroxide was poured and extended on one surface of a glass plate. The resulting layer of said mixture was covered with the same polyether film as in Example 1. Subsequently, the polyester film was pressed with a roller discharging air bubbles in the layer, so that the thickness of said layer was adjusted to be about 0.03 mm. The thus treated glass plate was heated in an air oven at 120° C. for 2 hours, and then the polyester film was stripped off to adhere only the resulting thin poly-(triethylene glycol dimethacrylate) resin layer onto the glass plate.

Two glass plates obtained in the above manner were faced each other so that the thin poly-(triethylene glycol dimethacrylate) resin layers were internally exposed, and a mold was prepared in the same manner as in Example 1. Into the mold was charged a partially polymerized methyl methacrylate containing 0.05% of azobisisobutyronitrile, and the interval between the glass plates was adjusted to 3 mm. The mold was heated in the same manner as in Example 1, and the resulting resin sheet was released from the glass plates.

The thin poly-(triethylene glycol dimethacrylate) resin layer on the glass plate surfaces had been completely transferred to the methacrylic resin sheet, and the resin sheet had beautiful surfaces free from wrinkles, unevenness and optical defects.

The mar value of the resin sheet obtained in this example was 13%, and even when the resin plate was subjected to cross cut-adhesive cellophane tape test, there was no stripped portion between the base resin and the surface layer.

EXAMPLE 5

A mixture comprising diethylene glycol dimethacrylate, and 0.3% of azobisisobutyronitrile, was poured and extended on one surface of a glass plate. The resulting layer of said mixture was covered with a 0.03 mm. thick cellophane film which had been subjected to tension. Subsequently, the film was pressed with a roller, discharging arm bubbles in said layer, so that the cellophane film was closely adhered to the glass plate and thickness of said layer was adjusted to be about 0.02 mm. The thus treated glass plate was heated in an air oven at 120° C, for 2 hours and then the cellophane film was stripped off to adhere the resulting thin poly-(diethylene glycol dimethacrylate) resin layer onto the surface of the glass plate.

Two glass plates obtained in the above manner were faced each other so that the thin poly-(diethylene glycol dimethacrylate) resin layers were internally exposed, and a mold was prepared in the same manner as in Example 1. Into the mold was charged a partially polymerized methyl methacrylate containing 0.05% of azoisobutyronitrile. Thereafter, the mold was sealed and the interval between the glass plates were adjusted to 5 mm. Subsequently, the mold was heated in a water bath at 60° C. for 6 hours and then in an air oven at 120° C. for 2 hours. After cooling the mold, the resulting resin sheet was released from the glass plates.

The thin poly-(diethylene glycol dimethylacrylate) resin layer on the glass plate surfaces had been completely adhered to the methacrylic resin sheet and the thus obtained resin sheet had beautiful surfaces free from wrinkles, unevenness and optical defects.

The mar value of the resin sheet obtained in this example was 18%, and even when the resin sheet was subjected to cross cut-adhesive cellophane tape test, there was no stripped portion between the base resin and the surface layer.

EXAMPLE 6

The procedures of Example 5 were repeated, except that a mixture comprising 40 parts of triethylene glycol dimethacrylate and 60 parts of methyl methacrylate was used as the polymerizable coating material and moisture-proof cellophane as the film for covering the layer of said mixture. As the result, the thin resin layer on the surfaces of the glass plates had been completely transferred to the methacrylic resin sheet, and the thus obtained resin sheet had beautiful surfaces free from wrinkles, unevenness and optical defects.

The mar value of the resin sheet obtained in this example was 24%, and even when the resin sheet was subjected to cross cut-adhesive cellophane tape test, there was no stripped portion between the base resin and the surface layer.

EXAMPLE 7

A mixture comprising tetraethylene glycol dimethacrylate, and 0.5% of lauroyl peroxide was poured and extended on one surface of a glass plate, and the resulting layer of said mixture was covered with the same polyester film as in Example 1. The polyester film was pressed with a roller, discharging air bubbles in said layer, so that the polyester film was closely adhered to the glass plate and the thickness of said layer was adjusted to about 0.02 mm.

The thus treated glass plate was heated in an air bath at 180° C. for 10 minutes, and then the polyester film was stripped off to adhere only the resulting thin resin layer onto the surface of the glass plate.

Two glass plates obtained in the above manner were faced each other so that the thin resin layer were internally exposed, and the circumference of the glass plates was sealed with a plasticized polyvinyl chloride gasket to prepare a mold. Into the mold was injected a partially polymerized methyl methacrylate containing 0.05% of azobisisobutyronitrile, and the interval between the glass plates was adjusted to 3 mm. The mold was heated in a water bath at 60° C. for 6 hours and then in an air oven at 120° C. for 2 hours, and was then cooled. Thereafter, the resulting resin sheet was released from the glass plates.

The thin resin layer on the glass plate surfaces had been completely adhered to the methacrylic resin sheet, and the thus obtained resin sheet had beautiful surfaces free from wrinkles, unevenness and optical defects.

The mar value of the resin plate obtained in this example was 12%, and even when the resin plate was subjected to cross cut-adhesive cellophane tape test, there was no stripped portion between the base resin and the surface layer.

EXAMPLE 8

A mixture comprising tetraethylene glycol dimethacrylate and 0.5% of lauroyl peroxide was poured and extended on one surface of a glass plate. The resulting layer of said mixture was covered with a polyester film. The polyester film was pressed with a roller, discharging air bubbles in said layer, so that the polyester film was closely adhered to the glass plate and the thickness of said layer was adjusted to about 0.03 mm.

The thus treated glass plate was heated in an air oven at 200° C. for 3 minutes and then the polyester film was peeled off to adhere only the resulting thin resin layer onto the surface of the glass plate.

The glass plate treated in the above manner was faced to a untreated glass plate, and the circumference of the glass plates was sealed with a plasticized polyvinyl chloride gasket to prepare a mold. Into the mold was charged a partially polymerized methyl methacrylate containing 0.05% of azobisisobutyronitrile, and the interval between the glass plates was adjusted to 3 mm.

The mold was heated in a water bath at 60° C. for 6 hours and then in an air oven at 120° C. for 2 hours and was cooled. Thereafter, the resulting resin sheet was released from the glass plates. The thin resin layer on the glass plate surface had been completely adhered to the methacrylic resin sheet, and the thus obtained resin sheet had a beautiful surface free from wrinkles, unevenness and optical defects. The mar value of the resin sheet was 54% on the untreated surface and was 11% on the treated surface. The treated surface of the resin sheet was subjected to cross cut-adhesive cellophane tape test, but there was no peeled portion between the base resin and the surface layer.

EXAMPLE 9

A monomer mixture comprising 60 parts of tetraethylene glycol dimethacrylate and 40 parts of triethylene glycol dimethacrylate was incorporated with 0.3% of azobisisobutyronitrile and was poured and extended on one side of a glass plate. The resulting layer of said mixture was covered with the same polyester film as in Example 1. The polyester film was pressed with a roller, discharging air bubbles in the mixture, so that the polyester film was closely adhered to the glass plate and the thickness of said layer was adjusted to about 0.02 mm.

The thus treated glass plate was heated in an air oven at 120° C. for 2 hours. Thereafter, the polyester film was peeled off to adhere only the resulting thin resin layer onto the surface of the glass plate.

Two glass plates obtained in the above manner were faced each other so that the thin resin layers were internally exposed, and the circumference of the glass plates was sealed with a plasticized polyvinyl chloride gasket to prepare a mold. Into the mold was charged a partially polymerized methyl methacrylate, and the interval between the glass plates was adjusted 3 mm. The mold was heated in a water bath at 60° C. for 6 hours and then in an air oven at 120° C. for 2 hours to polymerize the base material. After cooling the mold, the resulting resin sheet was released from the glass plates.

The thin resin layer on the glass plate surfaces had been completely adhered to the methacrylic resin sheet, and the thus obtained resin sheet had beautiful surfaces free from wrinkles, uneveness and optical defects. The mar value of the resin sheet was 12%, and even when the resin sheet was subjected to cross cut-adhesive tape test, there was no peeled portion between the base resin and the surface layer.

EXAMPLE 10

A resin sheet was produced under the same conditions as in Example 9, except that the polymerizable coating material employed was a monomer mixture comprising 80 parts of tetraethylene glycol dimethacrylate and 20 parts of methyl methacrylate.

The resin sheet had optically beautiful surfaces free from wrinkles and unevenness. The mar value of the resin sheet was 13%, and even when the resin sheet was subjected to cross cut-adhesive cellophane tape test, there was no peeled portion between the base resin and the surface layer.

EXAMPLE 11

A resin shet was produced under exactly same conditions as in Example 9, except that the polymerizable coating material employed was a monomer mixture comprising 70 parts of 1,6-hexanediol dimethacrylate and 30 parts of tetraethylene glycol dimethacrylate.

The resin sheet had optically beautiful surfaces free from wrinkles and uneveness. The mar value of the resin sheet was 14%, and even when the resin sheet was subjected to cross cut-adhesive cellophane tape test, there was no peeled portion between the base resin and the surface layer.

EXAMPLE 12

A resin sheet was produced under exactly the same conditions as in Example 1, except that bis-(ethylene glycol) phthalate dimethacrylate was used in place of the tetraethylene glycol dimethacrylate.

The resin sheet had optically beautiful surfaces free from wrinkles and uneveness. The mar value of the resin sheet was 16%, and even when the sheet was subjected to cross cut-adhesive tape test, there was no peeled portion between the base resin and the surface layer.

EXAMPLES 13 TO 18

The same procedure as in Example 1 was repeated with varying conditions and varying a polymerizable coating material and base resin compositions, the results obtained are shown in Table 1.

TABLE 1

| Condition | Example No. 13 | 14 | 15 | 16 | 17 | 18 |
|---|---|---|---|---|---|---|
| Coating material compositions, percent | Triethyleneglycol diacrylate, 100. | Decamethylene glycol diacrylate, 100. | Bis-(ethylene glycol) phthalate dimethacrylate 100. | TEDMA,[1] 80; EDMA,[2] 10; MMA,[3] 10; Tinuvin-p,[4] 0.2. | TEDMA; 80; MMA, 20; Tinuvin-p, 0.5. | TEDMA, 80; MMA, 30; Tinuvin-p, 0.2. |
| Polymerization initiator of coating material, percent. | AIBN,[5] 0.1 | LPO,[6] 0.3 | AIBN, 0.2 | AIBN, 0.2 | AIBN, 0.3 | AIBN, 0.2. |
| Thickness of coating material, mm | 0.02 | 0.02 | 0.03 | 0.04 | 0.03 | 0.03. |
| Cover films and its thickness, mm | PES,[7] 0.025 | PES, 0.025 | PES, 0.025 | PES, 0.025 | PES, 0.050 | PES, 0.050. |
| Polymerization condition of coating material, °C. times hours | 60×4 plus 120×2 | 80×2 plus 130×1 | 130×2 | 120×3 | 140×0.5 | 160×¼. |
| Base resin composition, percent | MMA, 90; St,[8] 10. | MMA, 100 | MMA, 75; Phosgard,[9] 25 | St, 75; MMA, 20 EDMA 5. | St, 68; AN[10], 30 EDMA, 2. | MMA, 85 St, 5; BD-BA-MMA,[11] 10. |
| Polymerization initiator for base resin, percent. | AIBN, 0.07 | BPO,[12] 0.2 | AIBN, 0.1 | AIBN, 0.1 | BPO, 0.3 | AIBN, 0.05. |
| Polymerization condition for base resin °C. times hours.[13] | 60×20 plus 130×1 | 55×30 plus 120×2 | 60×16 plus 100×2 | 60×16 plus 120×2 | 60×16 plus 110×1 | 65×4 plus 120×1 |
| Thickness of base resin, (mm.) | 3 | 4 | 3 | 3 | 3 | 2. |
| Mar value, percent | 14 | 13 | 12 | 12 | 13 | 14. |
| Mar value of base resin, percent[14] | 59 | 53 | 68 | 76 | 72 | 57. |

[1] TEDMA; tetra ethylene glycol dimethacrylate.
[2] EDMA; ethylene glycol dimethacrylate.
[3] MMA; methyl methacrylate.
[4] Tinuvin-p: U.V. absorber, J.L. Geigy.
[5] AIBN: Azobisisobutyronitrile.
[6] LPO: Lauroyl peroxide.
[7] PES: poly ester film.
[8] St: styrene.
[9] Phosgard; Phosgard C-22-R, chlorinated polyphosphonate, Monsanto Chem.
[10] AN: Acrylonitrile.
[11] Bd-BA-MMA: Butadiene, 40 percent; butyl acrylate 50 percent; MMMA, percent copolymer.
[12] BPO; Benzoyl peroxide.
[13] 2 step polymerization.
[14] Comparative data (mar value of untreated base resin).

What is claimed is:

1. A process for producing a molded synthetic resin article having a surface composed of a mar resistant layer which comprises applying onto the inner surface of a mold a polymerizable coating material selected from the group consisting of monomers, mixtures of such monomers, mixtures of at least 40% by weight of such monomers and other monomers copolymerizable therewith, and partially polymerized material thereof, said monomers being represented by the general formula

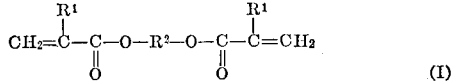

$$CH_2=\underset{\underset{O}{\|}}{\overset{R^1}{C}}-C-O-R^2-O-C-\underset{\underset{O}{\|}}{\overset{R^1}{C}}=CH_2 \quad (I)$$

wherein $R^1$ is one member selected from hydrogen and methyl groups; and $R^2$ is a divalent residue of one member selected from the group consisting of aliphatic hydrocarbons having 2–20 carbon atoms and derivatives thereof which may contain ether linkages in the main chain, and the general formula:

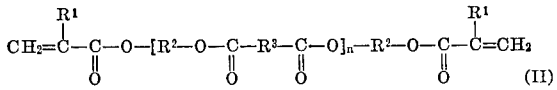

$$CH_2=\overset{R^1}{C}-C-O-[R^2-O-C-R^3-C-O]_n-R^2-O-C-\overset{R^1}{C}=CH_2 \quad (II)$$

Wherein $R^1$ and $R^2$ are the same in the general Formula I; $R^3$ is a dibasic acid residue of one member selected from the group consisting of aliphatic and aromatic hydrocarbons and derivatives thereof; and $n$ is an integer of 1 to 20, closely covering the polymerizable coating material by a film having no affinity for polymer produced from said material, thereby making said coating material uniform and intercepting oxygen, thoroughly polymerizing the polymerizable coating material, stripping off the film, charging into the mold a mixture of a starting material for base resin and a polymerization initiator, polymerizing said starting material for base resin and then releasing only the resin article from the mold after the completion of the polymerization.

2. A process according to claim 1, wherein the film is a polyester film.

3. A process according to claim 1, wherein the film is one member selected from the group consisting of films of polyvinyl alcohol, cellophane or regenerated cellulose, moisture-proof cellophane or moisture-proof regenerated cellulose, cellulose diacetate and cellulose triacetate, and of polypropylene, poylethylene, poylvinyl chloride and polyvinylidene chloride which contain a stabilizer in such an amount as not to substantially disturb the polymerization.

4. A process according to claim 1, wherein the polymerizable coating material is a material containing at least 40% by weight of at least one member selected from the group containing of diethylene glycol dimethacrylate, triethylene glycol dimethacrylate and tetraethylene glycol dimethacrylate, and polyethylene glycol dimethacrylate, which is higher in average molecular weight than tetraethylene glycol dimethacrylate bis-(ethylene glycol) phthalate dimethacrylate, bis-(diethylene glycol, phthalate dimethylacrylate and bis-(ethylene glycol) phthalate diacrylate.

5. A process according to claim 1, wherein the starting material for base resin is a material containing at least 50% by weight of at least one member selected from the group consisting of methyl methacrylate and styrene.

6. A process according to claim 1, wherein the thickness of a polymer layer formed by thorough polymerization of the polymerizable coating material adhered onto the inner surface of the mold is between 0.001 mm. and 1.0 mm.

References Cited

UNITED STATES PATENTS

| | | | |
|---|---|---|---|
| 2,997,745 | 8/1961 | Kroeker | 264—240 |
| 3,219,735 | 11/1965 | Iverson et al. | 264—212 X |
| 3,320,344 | 5/1967 | Slipp | 264—255 X |
| 3,328,499 | 6/1967 | Barnette | 264—255 X |

ROBERT F. WHITE, Primary Examiner

J. H. SILBAUGH, Assistant Examiner

U.S. Cl. X.R.

264—1